No. 826,894. PATENTED JULY 24, 1906.
R. H. SHAILER.
HANDLE FOR TOOLS.
APPLICATION FILED AUG. 25, 1904.
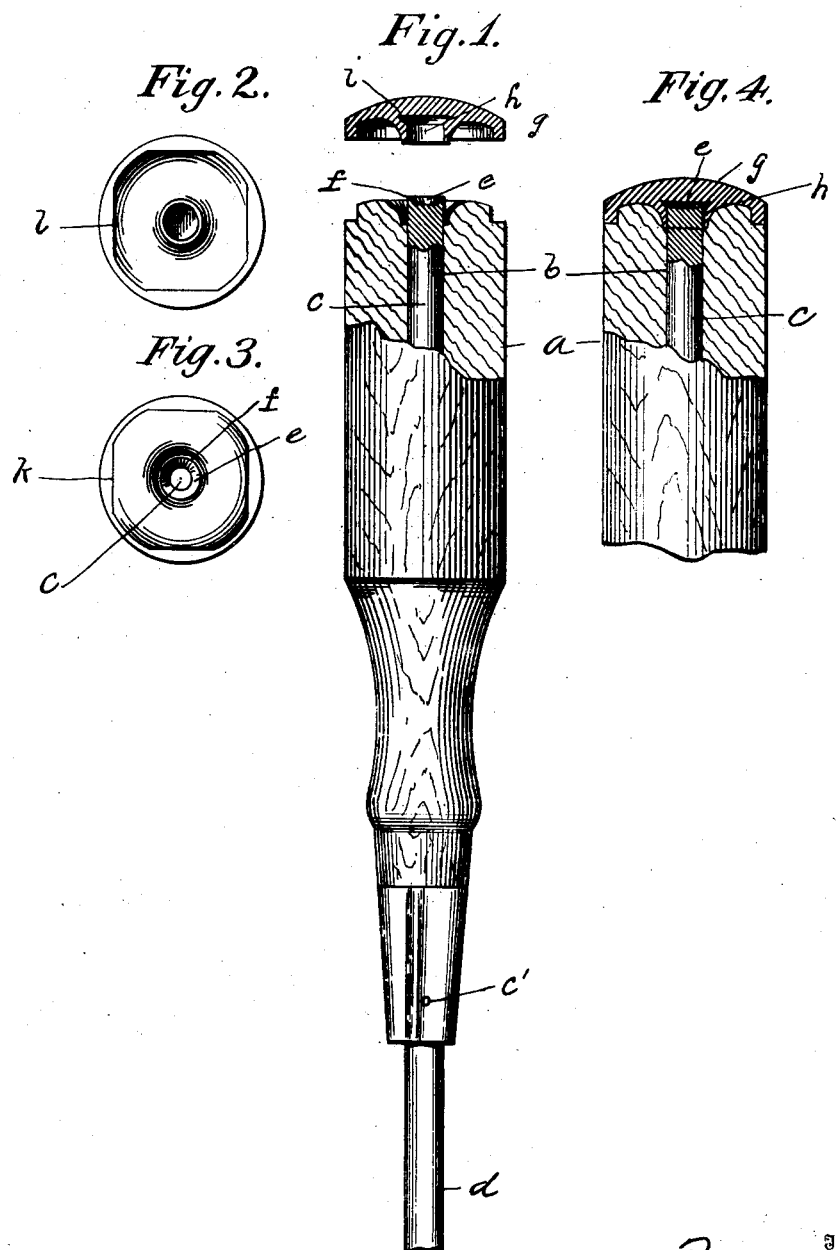

UNITED STATES PATENT OFFICE.

RUSSELL H. SHAILER, OF FORESTVILLE, CONNECTICUT.

HANDLE FOR TOOLS.

No. 826,894.　　　　Specification of Letters Patent.　　　Patented July 24, 1906.

Application filed August 25, 1904. Serial No. 222,092.

*To all whom it may concern:*

Be it known that I, RUSSELL H. SHAILER, a citizen of the United States of America, residing at Forestville, in the county of Hartford and State of Connecticut, have invented certain new and useful Improvements in Handles for Tools, of which the following is a specification.

This invention relates to a novel means of attaching a handle to a tool, such as a screwdriver or the like.

Figure 1 is a general side view of a tool embodying my invention, some parts being shown in section and the cap being removed from the end of the handle. Fig. 2 is a bottom view of the cap. Fig. 3 is an end view of the handle with the cap removed. Fig. 4 is a view of the end of the handle, shown partly in section, with the cap secured in place.

Referring to the drawings, there is the usual handle $a$, centrally pierced, as at $b$, to receive the shank $c$ of the tool $d$. The end of the shank is slightly cupped, as at $e$, its walls terminating in a thin edge, as at $f$, and gradually increasing in thickness toward the bottom of the cupping. A metallic cap $g$ has centrally-arranged recess $h$ to take over the cup end of the shank, said recess having a flat bottom and undercut walls $i$. Endwise displacement of the handle in the shank is prevented by the pin $c'$, which passes through the handle and shank. After fitting the cap onto the end of the shank a blow spreads the end of the shank into the undercut of the recess in the cap, the bottom of said recess acting as an anvil to spread the end of the shank. The recess is undercut, and the end of the shank is cupped only to a slight extent. Only a small amount of spreading is necessary in order to secure the cap to the shank so that it will not come loose, and when this spreading has been accomplished a substantially solid surface of the shank is in contact with the bottom of the recess in the cap, which prevents any further splitting or spreading of the shank, which would be injurious to the cap and to the handle.

In the use of devices to which this invention may be applied it very frequently happens that blows are struck on the cap by a hammer or mallet, and were it not for the fact that as soon as a sufficient amount of spreading of the end of the shank occurs to lock it and the cap together, the two solid surfaces on the cap and shank bringing up against one another, the splitting or spreading action of the shank might continue to the eventual ruination of the handle. The cap is shaped to fit the end of the handle, so as to present a smooth surface.

In order to prevent the handle turning, I slab it off on one or more sides, as shown at $k$ in Fig. 3, and shape the cap correspondingly, as shown at $l$ in Fig. 2, to fit the end of the handle. The construction hereinabove described is the one preferred.

I claim as my invention—

1. In an article of the character described the handle centrally pierced, the tool having a solid shank fitting in and passing through said handle, the end of said shank being slightly cupped, and a cap having a recess to receive said shank, the side walls of said recess being undercut near the bottom thereof whereby under the force of a blow on the cap the cupped end of the shank is spread into the undercut portion of the recess and substantial solid surfaces on the shank and cap are brought into contact with one another, substantially as described.

2. In an article of the character described the handle centrally pierced, the tool having a solid shank fitting in and passing through said handle, the end of said shank being slightly cupped with its walls terminating in a thin edge, and a cap having a recess to receive the cupped end of said shank, the side walls of said recess being slightly undercut and the bottom thereof flat, whereby under the force of a blow on the cap the walls of the cupped end of the shank are spread to engage the undercut portion of the recess and substantial solid parts of the cap and shank being brought into contact after said spreading has occurred.

In testimony whereof I affix my signature in presence of two witnesses.

RUSSELL H. SHAILER.

Witnesses:
　H. E. HART,
　D. I. KREIMENDAHL.